(12) United States Patent
Burger

(10) Patent No.: US 12,114,616 B2
(45) Date of Patent: Oct. 15, 2024

(54) WATERING SCHEDULE CONTROL SYSTEM BASED ON POWER STATUS SENSOR

(71) Applicant: HUSQVARNA AB, Huskvarna (SE)

(72) Inventor: Victor Burger, Ulm (DE)

(73) Assignee: HUSQVARNA AB, Huskvarna (SE)

( * ) Notice: Subject to any disclaimer, the term of this patent is extended or adjusted under 35 U.S.C. 154(b) by 0 days.

(21) Appl. No.: 17/784,448

(22) PCT Filed: Oct. 27, 2020

(86) PCT No.: PCT/EP2020/080128
§ 371 (c)(1),
(2) Date: Jun. 10, 2022

(87) PCT Pub. No.: WO2021/115676
PCT Pub. Date: Jun. 17, 2021

(65) Prior Publication Data
US 2023/0033560 A1  Feb. 2, 2023

(30) Foreign Application Priority Data

Dec. 11, 2019 (SE) .................................. 1951432-2

(51) Int. Cl.
*A01G 25/16* (2006.01)
(52) U.S. Cl.
CPC ......... *A01G 25/165* (2013.01); *A01G 25/167* (2013.01)
(58) Field of Classification Search
CPC .... A01G 25/165; A01G 25/167; A01G 25/16; G05B 2219/2625; Y02A 40/22; Y02P 60/12
See application file for complete search history.

(56) References Cited

U.S. PATENT DOCUMENTS

| 5,097,861 | A | * | 3/1992 | Hopkins | ............... | A01G 25/16 |
| | | | | | | 239/69 |
| 5,960,813 | A | | 10/1999 | Sturman et al. | | |
| 7,058,197 | B1 | * | 6/2006 | McGuire | ............. | G06V 20/188 |
| | | | | | | 382/108 |
| 8,321,061 | B2 | | 11/2012 | Anderson | | |

(Continued)

FOREIGN PATENT DOCUMENTS

| CN | 202759941 U | 3/2013 |
| CN | 103250614 A | 8/2013 |

(Continued)

OTHER PUBLICATIONS

Search Report and Office Action for Swedish Application No. 1951432-2 mailed Sep. 15, 2020.

(Continued)

*Primary Examiner* — M. N. Von Buhr
(74) *Attorney, Agent, or Firm* — Burr & Forman LLP

(57) ABSTRACT

A watering schedule control system (200) includes a power source (106), a power status sensor (108) to generate a signal indicative of remaining power with the power source (106), and a controller (204) communicably coupled to the power source (106), and the power status sensor (108). The controller (204) has access to a watering schedule. The controller (204) is configured to receive the signal from the power status sensor (108) and modify the watering schedule based on the received signal.

10 Claims, 5 Drawing Sheets

(56) References Cited

U.S. PATENT DOCUMENTS

| | | | |
|---|---|---|---|
| 8,494,683 | B2 | 7/2013 | Piper et al. |
| 8,584,397 | B1 | 11/2013 | Marsh |
| 9,107,354 | B2 | 8/2015 | Martin et al. |
| 9,504,213 | B2 | 11/2016 | Levine et al. |
| 9,832,939 | B2* | 12/2017 | Russell ............... A01G 25/00 |
| 10,255,390 | B2* | 4/2019 | Mewes ............... G06N 20/00 |
| 10,939,626 | B2* | 3/2021 | Kremicki ............. A01G 25/00 |
| 10,973,183 | B2* | 4/2021 | Gungl ............... G05B 19/042 |
| 11,237,563 | B2* | 2/2022 | Javault ............... G05D 1/0246 |
| 2006/0032938 | A1 | 2/2006 | Pomey |
| 2007/0089365 | A1 | 4/2007 | Rowe |
| 2008/0058995 | A1 | 3/2008 | Holindrake et al. |
| 2010/0023173 | A1 | 1/2010 | Wu |
| 2011/0087379 | A1 | 4/2011 | Savelle, Jr. et al. |
| 2011/0271590 | A1 | 11/2011 | Poolar |
| 2014/0039967 | A1* | 2/2014 | Scharf ............ G06Q 10/06315 382/110 |
| 2014/0236868 | A1 | 8/2014 | Cook |
| 2015/0027044 | A1* | 1/2015 | Redden ............ A01M 21/043 47/58.1 R |
| 2015/0331404 | A1 | 11/2015 | Kantor et al. |
| 2016/0086032 | A1* | 3/2016 | Pickett ............. G06V 20/188 382/110 |
| 2016/0183483 | A1* | 6/2016 | Motohari Sharif .. A01G 25/165 700/284 |
| 2017/0188531 | A1* | 7/2017 | Daniels ............... A01G 7/045 |
| 2018/0059691 | A1* | 3/2018 | Fleming ............... G06Q 50/02 |
| 2018/0160636 | A1 | 6/2018 | Hester |
| 2019/0050948 | A1* | 2/2019 | Perry ............... G06V 20/188 |
| 2019/0297798 | A1 | 10/2019 | Levine et al. |
| 2019/0335688 | A1* | 11/2019 | Tirupathi ............ G01W 1/10 |
| 2020/0037522 | A1* | 2/2020 | DeJarnette ........... A01G 27/003 |
| 2020/0323156 | A1* | 10/2020 | Etienne ............... A01G 25/167 |
| 2020/0359581 | A1* | 11/2020 | Zhang ................. A01G 25/167 |
| 2021/0100173 | A1* | 4/2021 | Khwaja ............... A01G 9/24 |

FOREIGN PATENT DOCUMENTS

| | | | | |
|---|---|---|---|---|
| CN | 207443583 | U | 6/2018 | |
| CN | 207541452 | U | 6/2018 | |
| JP | 2018038329 | A | 3/2018 | |
| JP | 2019508041 | A | 3/2019 | |
| JP | 2019534701 | A | 12/2019 | |
| WO | 20170105695 | A1 | 6/2017 | |
| WO | WO-2017174148 | A1 * | 10/2017 | ............ A01G 25/02 |

OTHER PUBLICATIONS

International Search Report & Written Opinion from International Application No. PCT/EP2020/080128 mailed Feb. 4, 2021, all pages cited in its entirety.

* cited by examiner

WATERING SCHEDULE CONTROL SYSTEM BASED ON POWER STATUS SENSOR

TECHNICAL FIELD

The present disclosure relates to a watering system. More specifically, the present disclosure relates to an improved watering schedule control system.

BACKGROUND

Irrigation control systems for controlling flow of water through multiple watering channels are well known in the art. With respect to the simpler types of irrigation controllers, a user typically sets a watering schedule that involves specific run-times and days for each of a plurality of watering channels, and the controller executes the same schedule. More sophisticated irrigation controllers consider other parameters, such as, for example, evapotranspiration rates, weather conditions, soil type and plant types for determining an amount of water to be applied to a landscape and controlling irrigation schedules. Such systems typically include a controller with multiple sensors connected to the controller, each sensor being able to provide data with respect to control parameters.

An example of an irrigation control system is provided in U.S. Pat. No. 8,321,061 (hereinafter referred to as '061 reference). The '061 reference discloses a system and method for delivering water to one or more plants. The system gathers data pertaining to plant's watering need and soil moisture content to compute watering intervals during a specified period of time. The system further computes availability and cost associated with the operation of each of available energy sources, such as wind energy, solar energy, and electric power from power grid or storage battery. The system takes into consideration a battery state of charge only for computing cost of operation and possible alternatives for operating the system.

Another example of an irrigation control system is provided in U.S. patent application 2011/0,271,590 (hereinafter referred to as '590 reference). The '590 reference discloses a garden system wherein a control module is connected between a power source and a pump to provide a timing signal to the pump for delivering water according to a water cycle. The power source includes a battery that can be recharged by a solar panel. The control module can optimally charge and conserve the battery based on weather conditions.

There is a need for an improved irrigation controller that can also modify watering cycles or timing based on availability of power with the energy sources.

SUMMARY

In view of the above, it is an objective of the present invention to solve or at least reduce the drawbacks discussed above. The objective is at least partially achieved by an improved watering schedule control system. The watering schedule control system includes a power source, and a power status sensor to generate a signal indicative of remaining power with the power source. The watering schedule control system further includes a controller communicably coupled to the power source and the power status sensor. The controller has access to a watering schedule. The watering schedule control system is characterized in that the controller is adapted to receive the signal from the power status sensor and modify the watering schedule based on the received signal.

According to an embodiment of the present invention, the watering schedule control system further includes a weather sensor adapted to generate a weather signal indicative of upcoming weather conditions. The weather sensor can provide inputs to the controller regarding upcoming weather conditions so as to modify the watering schedule based on upcoming weather conditions.

According to an embodiment of the present invention, the weather sensor is further adapted to communicate with a remote server to obtain weather data prediction. Such a communication will allow the weather sensor to more accurately predict the upcoming weather conditions. More accurate weather prediction will allow better modifications to the watering schedule by controller which in turn will allow the controller to better control the watering activity.

According to an embodiment of the present invention, the controller is adapted to receive the weather signal from the weather sensor and modify the watering schedule based on the received weather signal. This will allow the watering schedule control system to better manage the available resources for providing water to plants.

According to an embodiment of the present invention, the watering schedule control system includes a water reservoir and a reservoir level sensor adapted to generate a water level signal indicative of water level within the water reservoir.

According to an embodiment of the present invention, the controller is adapted to receive the water level signal from the reservoir level sensor and modify the watering schedule based on the received water level signal. This will allow the watering schedule control system to optimize watering of plants based on availability of water.

According to an embodiment of the present invention, watering schedule control system includes a plant wellness sensor configured to generate a plant wellness signal indicative of plant health. The wellness signal may provide indication of overall health of the plants.

According to an embodiment of the present invention, the controller is adapted to receive the plant wellness signal from the plant wellness sensor and modify the watering schedule based on the received plant wellness signal. This will allow the controller to determine health of the plants before modifying a watering schedule for the plants. For example, if a plant is showing signs of ill health, the controller may increase or decrease watering input accordingly to revive health of the plant.

According to an embodiment of the present invention, the power source is selected from at least one of a solar energy source, a battery, and a wind power source.

According to an embodiment of the present invention, the controller is adapted to receive a user input indicative of a user preference of the watering schedule and modify the watering schedule based on the received user input. The system accepts user inputs for scheduling watering of plants. User input may provide a manual intervention which may cater to immediate actions required based on unforeseen circumstances.

According to an embodiment of the present invention, a self-learning module is adapted to provide a feedback to the controller indicative of a plant health. The self-learning module is trained based on correlating an assessment of the health of individual plants with sensor data captured for the same plants. Using this approach, the self-learning module can provide the expert knowledge on an on-going basis to the watering schedule control system.

According to an embodiment of the present invention, the controller is adapted to modify the watering schedule based on the feedback received from the self-learning module.

Other features and aspects of this invention will be apparent from the following description and the accompanying drawings.

BRIEF DESCRIPTION OF THE DRAWINGS

The invention will be described in more detail with reference to the enclosed drawings, wherein.

DESCRIPTION OF EMBODIMENTS

Figure 1:
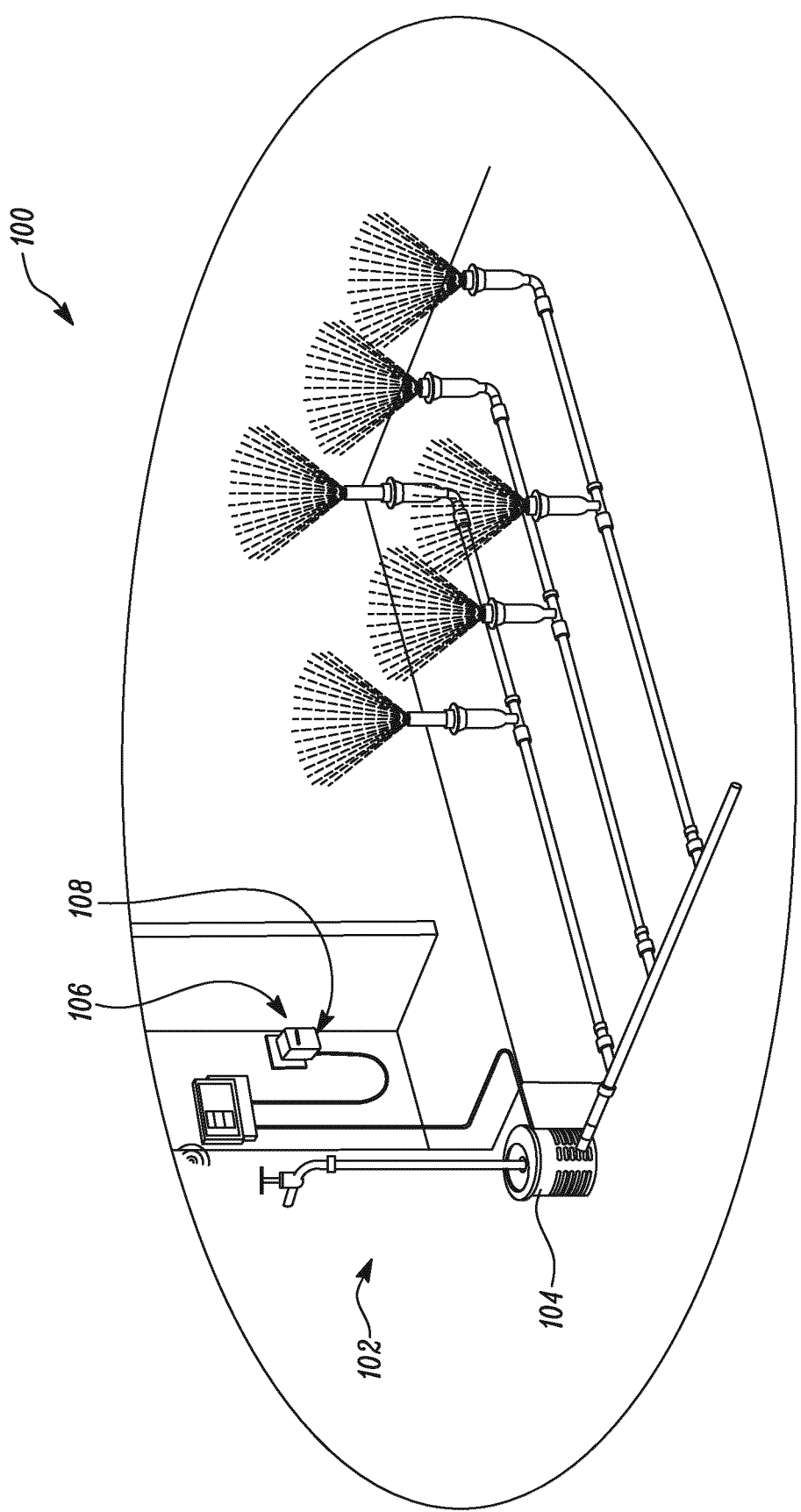
FIG. 1 shows perspective view of a garden environment wherein various embodiments of the present disclosure may be implemented.

The present invention will be described more fully hereinafter with reference to the accompanying drawings, in which example embodiments of the invention incorporating one or more aspects of the present invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. For example, one or more aspects of the present invention can be utilized in other embodiments and even other types of structures and/or methods. In the drawings, like numbers refer to like elements.

Certain terminology is used herein for convenience only and is not to be taken as a limitation on the invention. For example, "upper", "lower", "front", "rear", "side", "longitudinal", "lateral", "transverse", "upwards", "downwards", "forward", "backward", "sideward", "left," "right," "horizontal," "vertical", "upward", "inner", "outer", "inward", "outward", "top", "bottom", "higher", "above", "below", "central", "middle", "intermediate", "between", "end", "adjacent", "proximate", "near", "distal", "remote", "radial", "circumferential", or the like, merely describe the configuration shown in the Figures. Indeed, the components may be oriented in any direction and the terminology, therefore, should be understood as encompassing such variations unless specified otherwise.

In the drawings and specification, there have been disclosed preferred embodiments and examples of the invention and, although specific terms are employed, they are used in a generic and descriptive sense only and not for the purpose of limitation of the scope of the invention being set forth in the following claims.

FIG. 1 illustrates a gardening environment 100 within which various aspects of the present invention may be applied. For catering to watering needs of the gardening environment 100, a watering system 102 is implemented. The watering system 102 takes care of providing water to plants in the gardening environment 100. The watering system 102 includes a water reservoir 104. The water reservoir 104 holds, and supplies water needed for the watering system 102.

The water reservoir 104 may be a rain barrel, cistern or other water storage vessel with sufficient water capacity as readily understood by those skilled in the art. The water reservoir 104 may include access to a rain collector or any other water source that can limit the amount of water required from the direct water supply and to recycle any available water in the gardening environment 100. Other implementations may have multiple sources of rainwater feeding the water reservoir 104. In yet another implementation, a source of water for the water reservoir 104 may be grey water; household wastewater (as from a sink or bath) that does not contain serious contaminants (as from toilets or diapers). In yet another implementation, water can be obtained by condensing water vapor from air in the atmosphere.

Those skilled in the art will also appreciate that that the watering system 102 may be connected to a direct connection to a water supply, such as a water tap. Where a direct water supply is available, a hose or other supply line may be used to connect the water reservoir 104 to the water supply. This can be done to provide an alternative way to manually refill the water reservoir 104 or can be used with a more complex configuration to permit a self-filling system.

The watering system 102 includes a power source 106, which is adapted to supply energy to the watering system 102. It is to be understood that power source 106 may comprise a conventional power source, such as a storage battery, an electric power grid, or an electric generator driven by a gasoline powered engine or the like. However, in a useful embodiment, the power source 106 may also comprise a source of locally harvested energy, such as a solar energy collector, or an electric generator driven by a windmill or other wind energy sources. The power source 106 further includes a power status sensor 108 associated with the power source 106. The power status sensor 108 is adapted to generate a signal indicative of remaining power with the power source 106.

Figure 2:
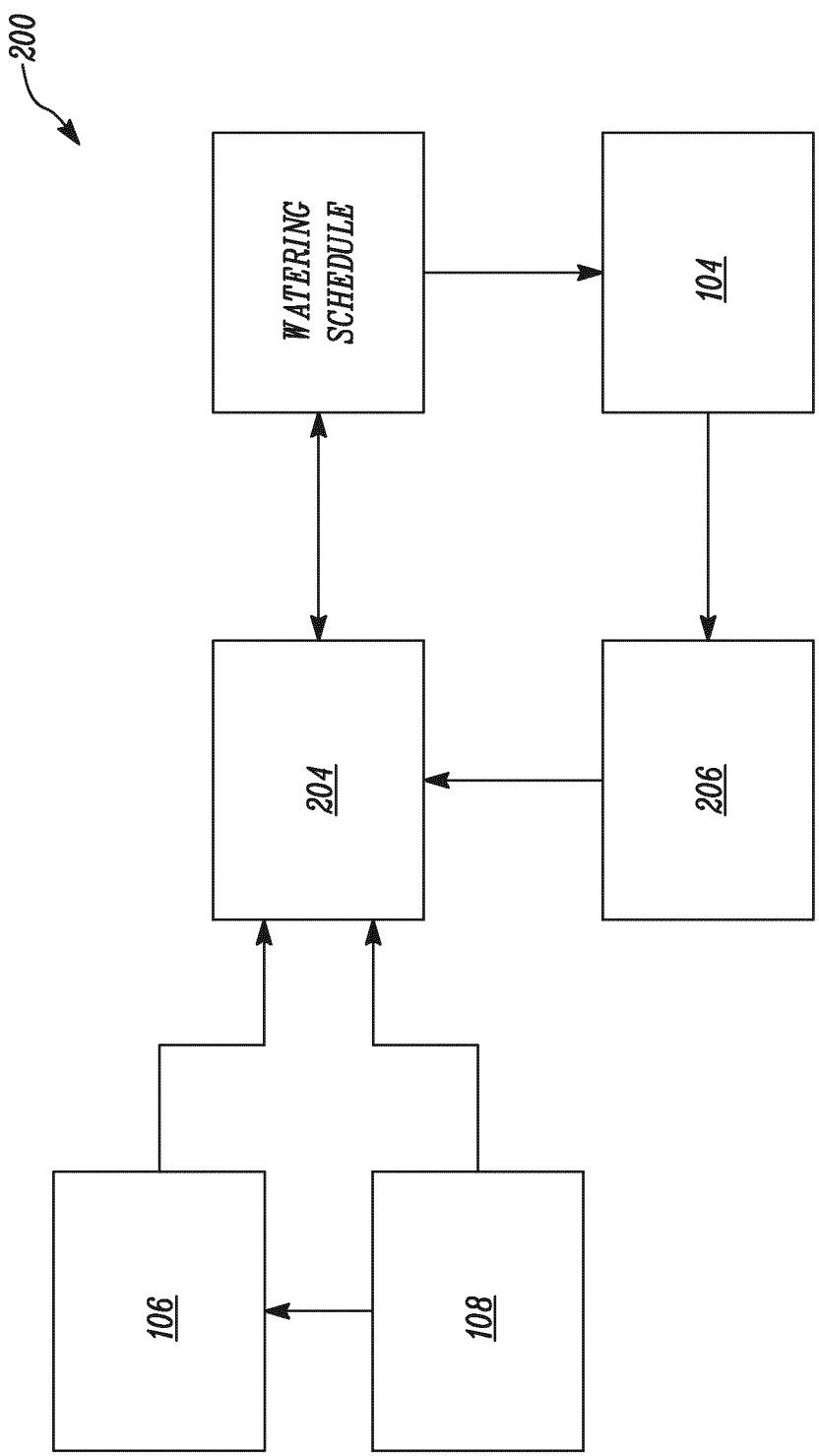
FIG. 2 shows block diagram of a watering schedule control system, in accordance with an embodiment of the present invention.

The watering system 102 includes a watering schedule control system 200 to control a watering schedule of the watering system 102. With reference to FIG. 2, the watering schedule control system 200 includes the power source 106. The watering schedule control system 200 further includes a power status sensor 108. The power status sensor 108 is communicably coupled to the power source 106. The power status sensor 108 is configured to determine status of remaining power with the power source 106. The status of remaining power may be provided in various ways based on a type of the power source 106. For example, if the power source 106 is a battery, a state of charge of the battery may be provided. If the power source 106 is a solar energy collector, status of remaining power may include current status of available power along with forecast of sunlight in upcoming timelines. It should be contemplated that the present disclosure is not limited by the type of the power source 106 in any manner.

The watering schedule control system 200 further includes a controller 204. The controller 204 may be embodied in a number of different ways. For example, the controller 204 may be embodied as various processing means such as one or more of a microprocessor or other processing element, a coprocessor, or various other computing or processing devices including integrated circuits such as, for example, an ASIC (application specific integrated circuit), an FPGA (field programmable gate array), or the like. In an exemplary embodiment, the controller 204 may be configured to execute instructions stored in a memory or otherwise accessible to the controller 204.

As such, whether configured by hardware or by a combination of hardware and software, the controller 204 may represent an entity (e.g., physically embodied in circuitry— in the form of processing circuitry) capable of performing operations according to embodiments of the present invention while configured accordingly. Thus, for example, when the controller 204 is embodied as an ASIC, FPGA or the like, the controller 204 may have specifically configured hardware for conducting the operations described herein. Alternatively, as another example, when the controller 204 is embodied as an executor of software instructions, the instructions may specifically configure the controller 204 to perform the operations described herein.

With continued reference to FIG. 2, the controller 204 is communicably coupled to the power source 106 and the power status sensor 108. In an embodiment of the present invention, the controller 204 has access to the watering schedule. In an implementation, the watering schedule may be stored in the memory of the controller 204. In yet another implementation, the watering schedule may be obtained through wireless communication from a centralized server or a cloud system by the controller 204.

The controller 204 is adapted to receive the signal from the power status sensor 108 and modify the watering schedule based on the received signal. The controller 204 may be pre-programmed to alter the watering schedule such that at least some watering is ensured for each day. Situations of no watering should preferably be avoided by conserving power of the power source 106 by alteration of the watering schedule and using the conserved power for watering in next cycle.

In one embodiment the watering schedule control system 200 may also include a water reservoir 104. The watering schedule control system 200 further may also include a reservoir level sensor 206. The reservoir level sensor 206 is communicably coupled to the controller 204. The reservoir level sensor 206 is configured to generate a water level signal indicative of water level within the water reservoir 104. The controller 204 receives the water level signal and modifies the watering schedule based on the received water level signal. The controller 204 may determine availability of water in the water reservoir 104 and change the watering schedule to conserve water accordingly to ensure avoidance of non-watering days.

Figure 3:
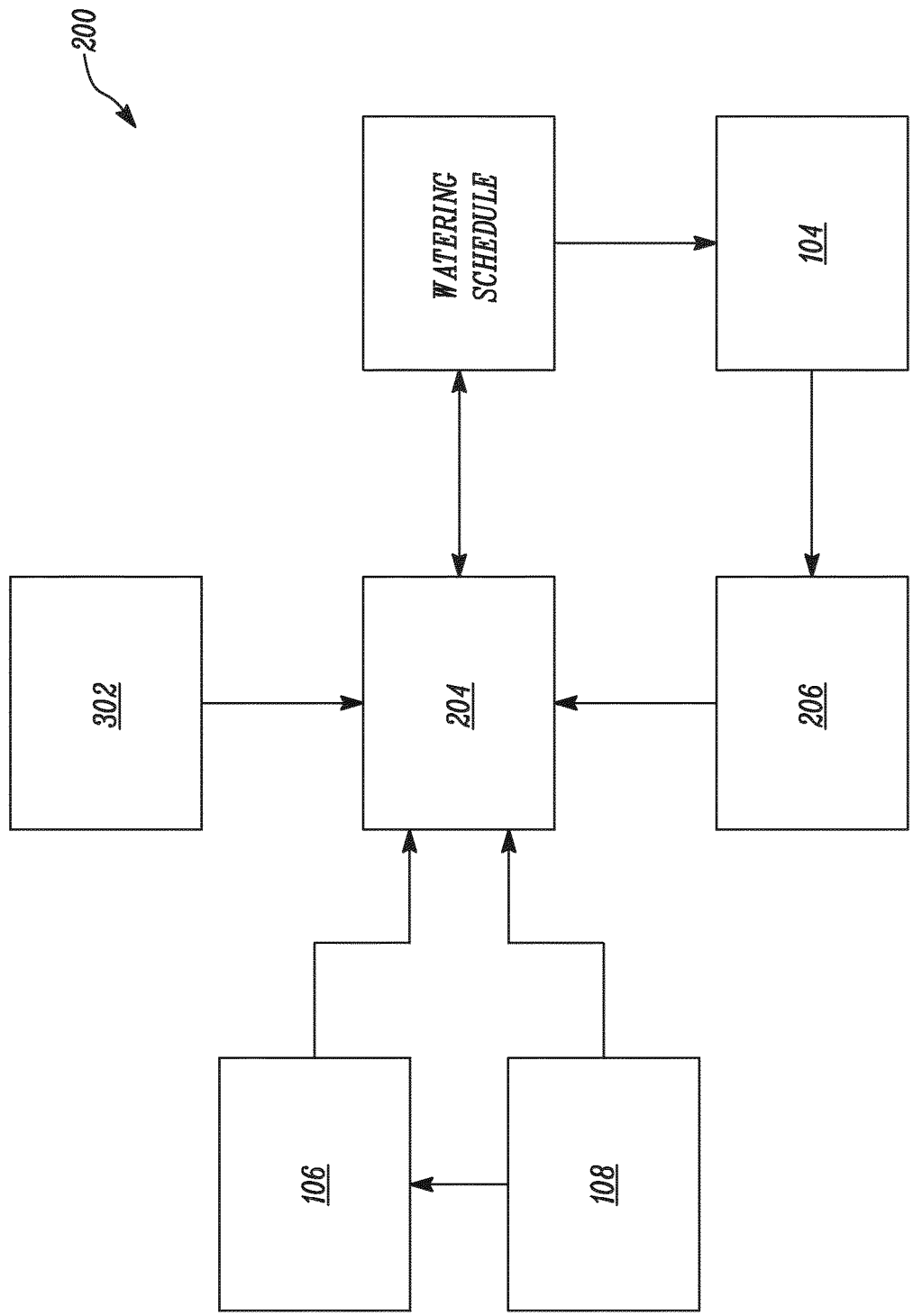
FIG. 3 shows block diagram of a watering schedule control system, in accordance with another embodiment of the present invention.

Referring to FIG. 3, the watering schedule control system 200 includes the power source 106, the power status sensor 108, the controller 204, the water reservoir 104 and the reservoir level sensor 206. The watering schedule control system 200 in the embodiment shown with FIG. 3 may further include a weather sensor 302. The weather sensor 302 is configured to generate a weather signal indicative of upcoming weather conditions. In an embodiment, the weather sensor 302 is further configured to communicate with a remote server to obtain weather data prediction. The weather sensor may either be embodied as an onboard sensor or may be incorporated with the controller 204. The controller 204 may communicate with the remote server to determine weather data prediction.

After determining the weather prediction, the controller 204 may have better visibility of available resources. For example, in case of sunlight expected, and power source being a solar power-based type power source 106, the controller 204 may provide adequate power required for adhering to watering schedule. However, in case of lesser sunlight expected, the controller 204 may reserve some amount of power to ensure watering is possible on next day as well. It should be contemplated that sunlight is just an exemplary parameter in the context of the present disclosure. Weather data may include parameters such as, but not limited to, humidity prediction, rainfall or precipitation prediction, wind prediction, and the like. The controller 204 may take some or all of such parameters into account and modify the watering schedule as per application requirements.

Figure 4:
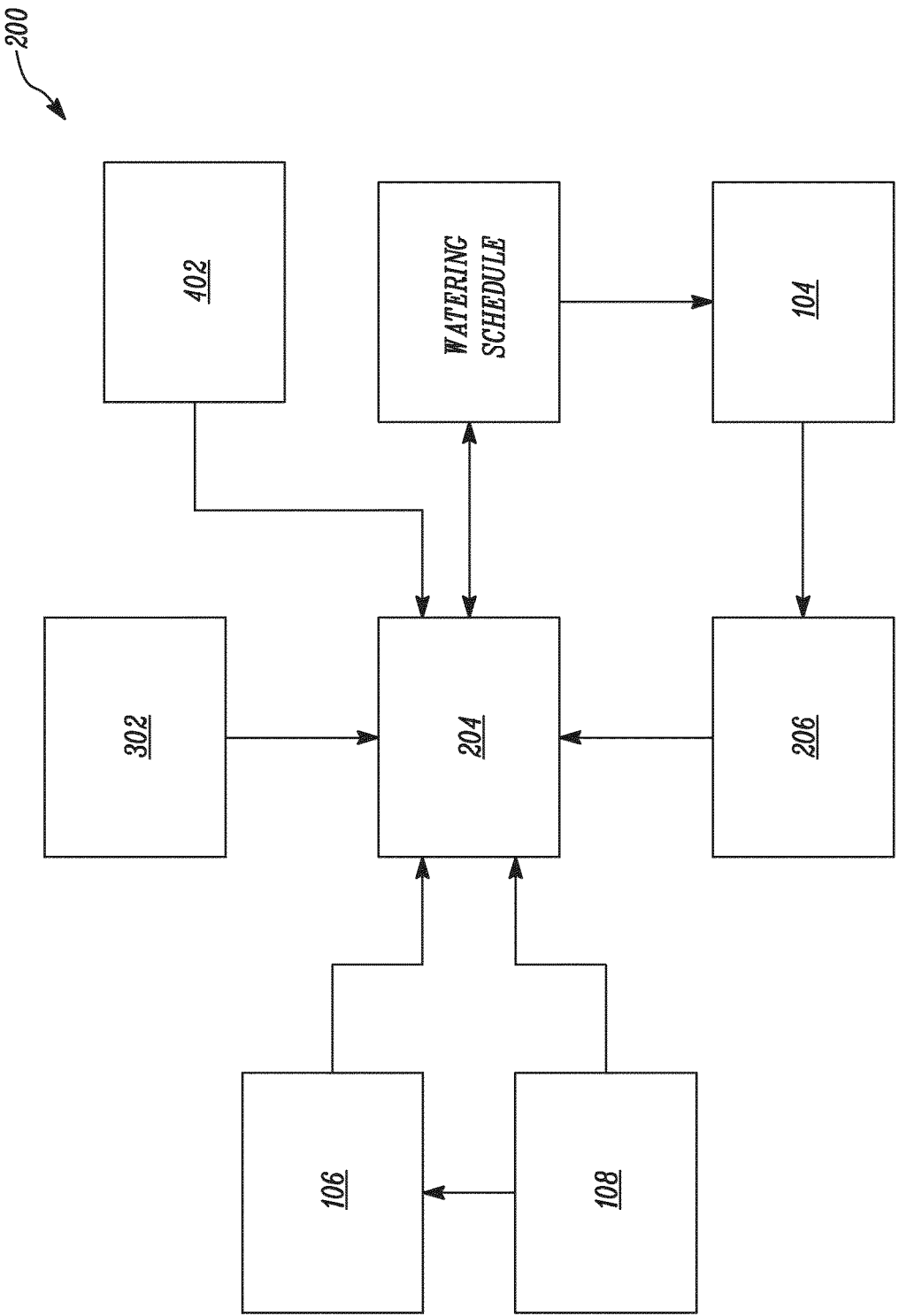
FIG. 4 shows block diagram of a watering schedule control system, in accordance with another embodiment of the present invention.

Referring to FIG. 4, in yet another embodiment the watering schedule control system 200 includes the power source 106, the power status sensor 108, the controller 204, the water reservoir 104, the reservoir level sensor 206, and the weather sensor 302. The watering schedule control system 200 may further include a plant wellness module 402. The plant wellness module 402 is configured to generate a plant wellness signal indicative of plant health.

The health of a plant may be determined by measuring how it reflects light. For example, a plant with leaves with healthy chlorophyll levels will reflect less visible light and reflect more near infra-red. Healthy levels of water absorption can be determined by the reflectance of the plant's leaves of shortwave infrared. Analysis of a plant's spectrum of absorption and reflection in the visible and in infrared wavelength is very useful in providing data about a plant's health. Each plant type has unique patterns and ranges for reflectance and healthy variations in these patterns. The differential between the ambient air temperature and leaf temperature is an indicator of plant stress. Data related to such parameters may be pre-stored with the controller 204, which may then be used to evaluate plant health. It should be contemplated that the examples discussed here are merely exemplary and any other such suitable parameters may also be used to analyze plant health.

Figure 5:
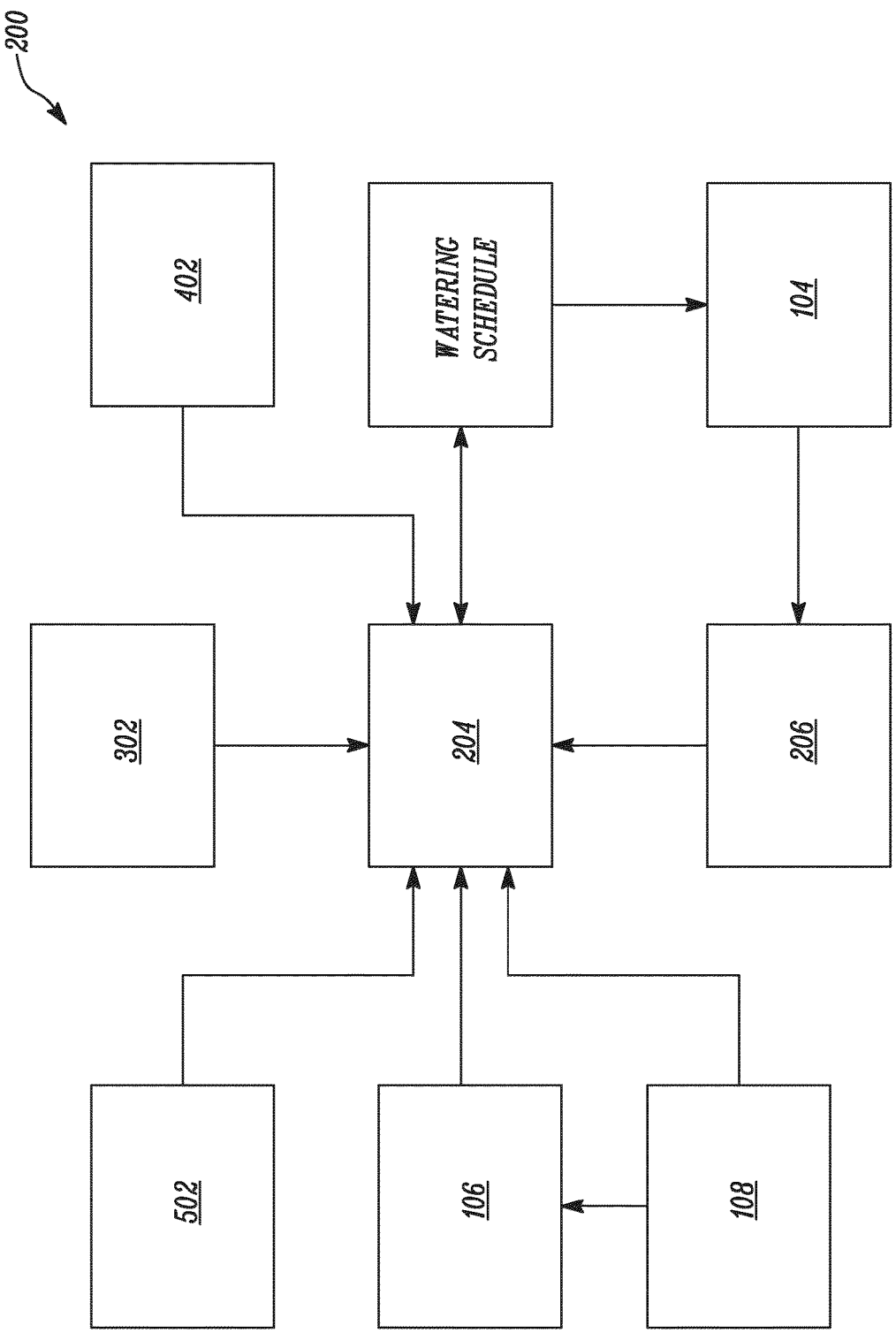
FIG. 5 shows block diagram of a watering schedule control system, in accordance with another embodiment of the present invention.

Referring to FIG. 5, the watering schedule control system 200 includes the power source 106, the power status sensor 108, the controller 204, the water reservoir 104, the reservoir level sensor 206, the weather sensor 302, and the plant wellness module 402. In this exemplary embodiment the watering schedule control system 200 further includes a self-learning module 502. The self-learning module 502 may be communicably coupled to the controller 204. The self-learning module may analyze parameters such as, but not limited to, watering patterns, schedules, changes implemented over existing watering schedules over time, user inputs provided, weather patterns across year etc. The self-learning module 502 may provide suggestive inputs to the controller 204 regarding changes to be done in the watering schedule.

Further, the self-learning module 502 may also be communicably coupled to the power status sensor 108, the reservoir level sensor 206, and the weather sensor 302. The self-learning module 502 may be coupled to the power status sensor 108, the reservoir level sensor 206, and the weather sensor 302 either directly or through the controller 204.

In the drawings and specification, there have been disclosed preferred embodiments and examples of the invention and, although specific terms are employed, they are used in a generic and descriptive sense only and not for the purpose of limitation of the scope of the invention being set forth in the following claims.

While the detailed description above has been expressed in terms of specific examples, those skilled in the art will appreciate that many other configurations could be used. Accordingly, it will be appreciated that various equivalent modifications of the above-described embodiments may be made without departing from the spirit and scope of the invention.

LIST OF ELEMENTS

100 Gardening environment
102 Watering system
104 Water reservoir
106 Power source
108 Power status sensor
200 Watering schedule control system
204 Controller
206 Reservoir level sensor
302 Weather sensor
402 Plant wellness module
502 Self learning module

The invention claimed is:

1. A watering schedule control system comprising:
a power source;
a power status sensor to generate a signal indicative of remaining power with the power source;
a water reservoir and a reservoir level sensor configured to generate a water level signal indicative of water level within the water reservoir;
a controller communicably coupled to the power source, and the power status sensor;
a weather sensor configured to generate a weather signal indicative of upcoming weather conditions, and
a self-learning module configured to communicate with the weather sensor and provide feedback to the controller,
whereby the controller is configured to:
receive the signal from the power status sensor; and
the water level signal from the reservoir level sensor;
wherein the controller accesses a watering schedule stored in a memory of the controller that defines specific run-times and days,
wherein the self-learning module learns an operating amount of water and power that is sufficient to operate the system during a single run-time of the watering schedule,
wherein the controller accesses the memory to modify the watering schedule to avoid situations of no watering responsive to the signal from the power status sensor indicating that the power source contains the operating amount of power that is sufficient to operate the system during the single run-time of the watering schedule,
wherein the controller is configured to reserve an amount of water and power to operate the system responsive to actual weather conditions differing from the weather signal,
wherein the amount of water reserved is a function of both the water level signal from the reservoir level sensor and an accumulation of the operating amount of water corresponding to a plurality of run-times,
wherein the self-learning module provides a suggestive input to the controller regarding a change to the watering schedule, and
wherein the controller receives a user input from a user of the watering schedule control system that acts upon the suggestive input of the self-learning module to modify the watering schedule accordingly.

2. The watering schedule control system of claim 1, wherein the weather sensor is further configured to communicate with a remote server to obtain weather data prediction.

3. The watering schedule control system of claim 2, wherein the controller is further configured to:
receive the weather signal from the weather sensor; and
modify the watering schedule based on the received weather signal.

4. The watering schedule control system of claim 1, further comprising:
a plant module configured to generate a health status signal indicative of a health status of a plant based on a spectrum of light absorbed by leaves of the plant.

5. The watering schedule control system of claim 4, wherein the controller is further configured to:
receive the health status signal from the plant module; and
modify the watering schedule based on the received health status signal.

6. The watering schedule control system of claim 1, wherein the power source is selected from at least one of a solar energy source, a battery, and a wind power source.

7. The watering schedule control system of claim 1, wherein the controller is further configured to:
receive the user input indicative of a user preference of watering schedule; and
modify the watering schedule based on the received user input.

8. The watering schedule control system of claim 1, wherein the self-learning module is configured to provide feedback to the controller indicative of a health status of a plant.

9. The watering schedule control system of claim 8, wherein the controller is further configured to:
modify the watering schedule based on the feedback received from the self-learning module to optimize the health status of the plant.

10. The watering schedule control system of claim 9, wherein the health status of the plant is based on a spectrum of light absorbed by leaves of the plant.

* * * * *